Patented Oct. 24, 1933

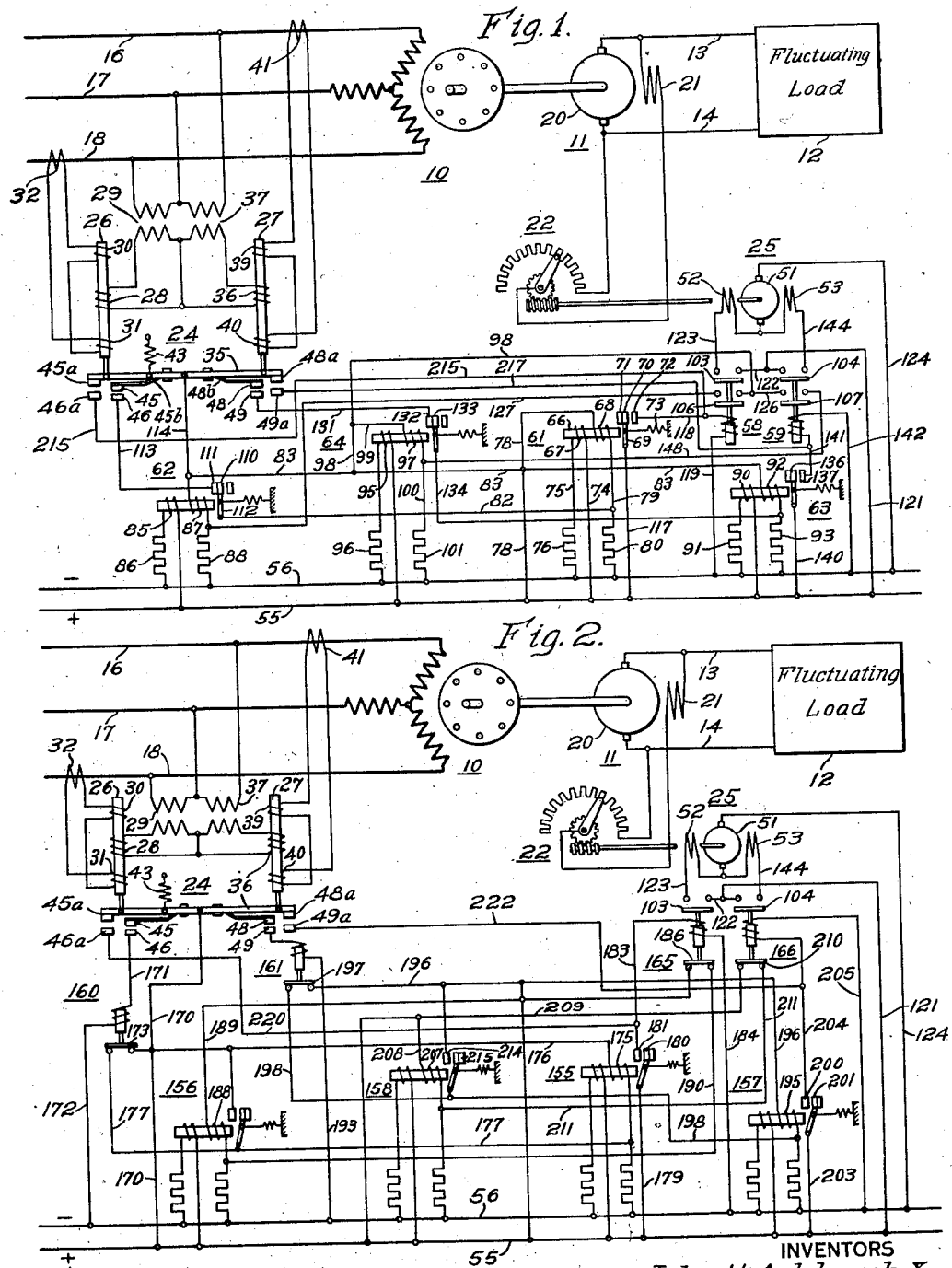

1,932,030

UNITED STATES PATENT OFFICE 1,932,030

REGULATING SYSTEM

John H. Ashbaugh, Springfield, Mass., and Ralph A. Geiselman, Wilkinsburg, Pa., assignors to Westinghouse Electric & Manufacturing Company, a corporation of Pennsylvania Application July 9, 1931. Serial No. 549,692

7 Claims. (Cl. 171—119)

Our invention relates to regulating systems, and has particular relation to means for causing a regulator to effect a step-by-step corrective action, with or without a time-delay-start feature, when the error to be corrected is less than a given magnitude, and to effect a continuous corrective action when the error is greater than this given magnitude.

In a number of regulator applications, it is desirable, in order to prevent hunting, that the corrective action of the quantity-adjusting means controlled by the regulator operate in a "step-by-step" or "notching" manner. Such notching, however, frequently serves a useful purpose only when the magnitude of the regulated quantity closely approaches the desired value, the notching action causing needless slowness of response at other times. It is desirable, therefore, that the corrective action, in such a system, be made continuous when the error to be corrected exceeds a given value. In many cases, also, it is preferable that a time delay be interposed between the initial closure of the regulator contacts and the resulting commencement of the corrective action. Our invention is directed to improved regulator-control means for accomplishing these results.

It is, accordingly, an object of our invention to provide, in a regulating system, means whereby the corrective action will be caused to proceed in a step-by-step manner so long as the error to be corrected is less than a given magnitude, and to proceed in a continuous manner when the error exceeds this magnitude.

It is an object of one aspect of our invention to provide means interposed between a regulator and a quantity-adjusting means controlled thereby to effect, for moderate error magnitudes, a time delay in the commencement of a corrective action, which action is thereafter caused to proceed in a step-by-step manner.

An object of another aspect of our invention is to provide means whereby a regulator effects, for moderate error magnitudes, an immediate commencement of corrective action, interruption after a given period, recommencement after another period, and repetition of this cycle as long as the regulator is acted upon by quantity errors not exceeding a given magnitude.

A further object of our invention is to provide a regulating system of the step-by-step corrective action type in which adjustment of the active and inactive periods in the corrective cycle may be independently made.

In practicing our invention, we attain the error-magnitude-responsive corrective-action selection by providing the regulator mechanism with two separate sets of contacts, the first set of which closes for small and moderate regulated-quantity errors and initiates a step-by-step corrective action, and the second set of which closes for larger errors and causes the corrective action to proceed in a continuous manner. The time-delay-start and step-by-step features are attained by disposing, between the said first set of regulator contacts and the quantity-adjusting means, a pair of time-delay relays which are so interconnected that one relay acts upon the other, which, in turn, reacts upon the first and thus permits the corrective action, which, when thus initiated, is caused to occur in accordance with the actuated and unactuated positions of one of these relays, to proceed in a notching manner.

Our invention will best be understood by a description of specific embodiments thereof when taken in conjunction with the accompanying drawing, in which Figure 1 is a diagrammatic view of apparatus and circuits arranged in accordance with one modification of my invention, incorporating a time-delay-start moderate-error action feature, applied to the load regulation of a motor-generator set, and, Fig. 2 is a diagrammatic view of apparatus and circuits arranged in accordance with a second modification of my invention, which is of the instantaneous-start moderate-error action type, also applied to the load regulation of a motor-generator set.

Referring to the drawing, and particularly Fig. 1 thereof, I have illustrated an alternating-current motor 10, arranged to drive a direct-current generator 11 which supplies electrical energy to a fluctuating load 12 through circuit conductors 13 and 14. The motor 10 is energized from a source of three-phase alternating current power represented by conductors 16, 17 and 18.

The generator 11 comprises an armature winding 20, to which the power-circuit conductors 13 and 14 are connected, and a field winding 21 that is supplied with exciting current from the power circuit conductors through a voltage-adjusting rheostat 22. Adjustment of the voltage of generator 11 may be effected in a well known manner by changing the setting of this rheostat.

The load 12 which the generator 11 supplies is of a type in which the power demand, or equivalent resistance of a circuit by which this load might be replaced for purposes of analysis, varies through a wide range. Were the voltage of generator 11 to remain substantially constant, these power-demand variations would be transmitted to driving motor 10 and thence to the alternating-current power source which supplies the motor.

For purposes of this discussion, it will be assumed that it is desired to maintain the power drawn by motor 10 through the supply-circuit conductors 16, 17 and 18, at a substantially constant value. To attain this objective, a load regulator 24 may be influenced by the motor-supply circuit and disposed to control the excitation of generator 11 in such manner that the power output of this machine will not be permitted to follow the wide variations of energy demand which fluctuating resistance load 12 would otherwise set up. It will be understood that, for a given condition of load 12, a lowering of the voltage of the generator 11 will decrease its output, while a raising of the voltage will correspondingly increase its output.

In the system of Fig. 1, the adjustment of the rheostat 22 is effected by a motor 25, mechanically connected thereto, and arranged to be operated in accordance with the operation of the load regulator 24.

As illustrated, the regulator 24 is of a well known type comprising a pair of movable core members 26 and 27, mechanically connected with a pivotally-mounted contact-carrying member 35. With the member 26 is associated a potential winding 28, energized from the alternating-current power circuit through a transformer 29, and a pair of current windings 30 and 31 energized by a current transformer 32 in accordance with the current flowing in circuit conductor 18 and, similarly, with core member 27 is associated a potential winding 36, energized from the alternating current circuit through a transformer 37, and a pair of current windings 39 and 40 energized by a current transformer 41 in accordance with the current flowing in circuit conductor 16.

The windings associated with core member 26 produce, when energized in the manner shown, a magnetic interaction which sets up a downwardly acting force on the member. Similarly, the windings associated with core member 27 produce a magnetic interaction resulting in an upwardly acting force on the member. The magnitude of both of these forces is dependent upon the quantity of power flowing in circuit conductors 16, 17 and 18. It will be seen that these two forces tend to rotate pivotally-mounted member 35 in a counter-clockwise direction. This rotation is opposed by a biasing member shown in the form of a tension spring 43.

In order to attain the selective step-by-step and continuous operation of the quantity adjusting means in accordance with the magnitude of the error to be corrected, we provide the contact-carrying member 35 of regulator 24 with two separate sets of contact elements for each direction of control of the quantity-adjusting means. Thus, in the case of the "lower" control, these sets of elements are indicated at 45—46 and 45a—46a and, in the case of the "raise" control, these sets are indicated at 48—49 and 48a—49a. The first-named sets in each group are disposed to initiate a step-by-step corrective action, while the last-named sets cause the action to be continuous in a manner to be further explained.

Since it is desirable that the step-by-step action proceed for small errors, and the continuous action proceed for larger errors, contact elements 45 and 46 and elements 48 and 49 are disposed to engage upon relatively small movements of member 35 from the neutral position illustrated. Hence, these elements are mounted rather close together, one element in each set being supported by resilient members indicated at 45b and 48b. Thus, when one of these step-by-step contact sets has been closed by regulator action, the resilient mounting thereof permits the regulator contact-carrying member 35 to be further displaced to cause the closure of the corresponding continuous-operation set of contact elements.

When the load drawn by motor 10 exceeds a desired value, by a moderate amount, the regulator thus acts to move contact member 45 to engage with contact member 46, and if the error exceeds a given larger magnitude, contact member 45a is also brought to engage with contact member 46a. Likewise, when the power drawn by the motor 10 falls below the desired value, the contact member 48 is moved to engage with contact member 49, and when the error exceeds a given magnitude, contact member 48a is also moved to engage with member 49a. These actions respectively cause the load-adjusting motor 25 to be operated in the load-lowering and load-raising directions, in a manner to be explained.

Load-adjusting or rheostat-operating motor 25 may be of any suitable type capable of reversible operation. As illustrated, it comprises an armature winding 51 and two separate and differentially-related field windings 52 and 53. The motor 25 may be energized from any suitable direct-current source which, in the system of Fig. 1, is illustrated in the form of circuit conductors 55 and 56.

When the armature of the motor 25 is energized by field winding 52, the motor rotates in a direction to move rheostat 22 in a "voltage-and-load-lowering" direction, and when the motor circuit includes the field winding 53, the motor rotates in the opposite or "load-raising" direction.

To control the energization of the motor 25, relays 58 and 59 are utilized, connection being made in the manner illustrated. The operation of the relay 58 to its circuit-closing position produces a load-lowering action of the motor 25, and the operation of the relay 59 to its circuit closing position produces a load-raising action of the motor.

To permit the load regulator 24 to operate the load-adjusting motor 25 in a step-by-step or "notching" manner, and to provide a time delay between the time of closing the regulator contact members and the starting of the corrective action, time delay relays illustrated at 61, 62, 63 and 64 are provided. Relays 61 and 62 are associated with "lower" regulator contact elements 45 and 46 and "lower" motor-control relay 58, while relays 63 and 64 are similarly associated with "raise" regulator-contact elements 48 and 49 and "raise" motor-control relay 59.

It will be observed that, in the system of Fig. 1, the time-delay relay 61, when actuated to its armature-released position, completes an energizing circuit for the motor-control relay 58 and likewise the time-delay relay 63, when actuated to its armature-released position, completes a similar energizing circuit for the motor-control relay 59. An examination of the circuit connections will further reveal that the regulator contact members 45a and 46a are likewise disposed to complete, upon their engagement, an energizing circuit for motor-control relay 58, while the regulator contact members 48a and 49a are similarly disposed to complete, upon their engagement, an energizing circuit for motor-control relay 59. Consequently, each motor-control relay mentioned may be actuated to a circuit closing position either by the operation of a time-delay relay controlled by the regulator or directly by a set of regulator contact members.

Each of the time-delay relays 61, 62, 63 and 64 is of the instantaneous-closing, time-delay opening type, and may be of any suitable design which provides this characteristic. One preferred embodiment of relay construction, which is illustrated in the system of Fig. 1, utilizes a magnetic core member with which is associated two differentially related magnetizing windings, one of which is continuously energized from a direct-current source and the other of which is connected to a similar source of energization but arranged to be short circuited when it is desired that the contact-carrying armature member of the relay move to a circuit closing position.

Thus, the relay 61, for example, comprises a core member 66 with which is associated an auxiliary winding 67 and a main or operating winding 68, differentially related to the winding 67 and having a larger number of magnetizing ampere turns. A pivotally-mounted armature member 69 carries a contact element 70 which respectively cooperates with stationary contact elements 71 and 72 when the relay is in its armature-attracted and armature-released positions respectively. A spring biasing member 73 exer's a force tending to move the armature 69 away from core member 66. The auxiliary winding 67 is continuously energized from the direct-current source comprising conductors 55 and 56 by a circuit which includes conductor 74, the winding 67, conductor 75 and a resistor 76. Similarly, operating winding 68 is connected with energizing source conductors 55 and 56 by a circuit which includes conductor 78, the winding 68, conductor 79, and a current-limiting resistor 80.

In the operation of the time delay relays, of which relay 61 described is representative, simultaneous energization of the auxiliary or neutralizing winding 67 and the main or operating winding 68 sets up a magnetic force upon relay armature member 69 sufficient to overcome the tension of spring 73 and move contact element 70 into engagement with element 71. This magnetic force results from the fact that the operating winding 68 has a larger number of magnetizing ampere turns so that it completely overcomes the opposing magnetizing force of neutralizing winding 67 and in addition supplies an excess of magnetic flux in the core member.

Short circuiting the operating winding 68, accomplished in the system of Fig. 1 by a connection of conductor 82 with conductor 83, removes the magnetizing force from the main winding and allows the neutralizing winding 67 to slowly reduce the strength of the magnetic field which had been established by the main winding, the short-circuited turns of the main winding acting as a magnetic damper to limit the rate of flux decrease. After a time delay, the strength of this magnetic field is reduced to a sufficiently low value to permit biasing spring 73 to move armature member 69 to the armature-released position in which contact element 70 comes into engagement with element 72.

The length of this time delay may be adjusted in a well known manner by changing the relative magnetizing strengths of the neutralizing and the operating relay windings and by changing the tension of the armature biasing spring.

Removal of the short circuit from the operating winding 68 permits its magnetizing ampere turns to again become effective. This results in a rapid building up of magnetic flux in the relay core 66 and a consequent immediate attraction of armature member 69 towards the core.

Thus it is evident that relay 61, for example, will move its armature, from the armature-attracted position shown, to its circuit closing or armature-released position only after an appreciable time has elapsed from the instant of short circuiting of the operating winding. Once in the armature-released position, however, a removal of the short circuit from the relay-operating winding results in an immediate return of the armature to the illustrated position.

The construction and operation of relays 62, 63 and 64 may be similar to that of relay 61 already explained and described, and in the system of Fig. 1 they are so illustrated. Thus relay 62 comprises a neutralizing winding 85, energized from circuit conductors 55 and 56 through a resistor 86, and an operating winding 87 energized from these direct-current source conductors through a circuit which extends from conductor 55 through conductors 78 and 83, the winding 87, and a resistor 88 back to conductor 56.

In like manner, the neutralizing winding 90 of relay 63 is energized through a resistor 91, and the operating winding 92 is energized through a circuit which extends from conductor 55, through conductors 78 and 83, the winding 92, and a resistor 93 back to conductor 56. The neutralizing winding 95 of relay 64 is likewise energized through a circuit which includes a resistor 96, while the operating winding 97 of this relay is energized by a circuit which extends from positive conductor 55, through conductors 78, 83, 98 and 99, the winding 97, conductor 100, and resistor 101 back to negative conductor 56.

The motor-control relays 58 and 59, previously mentioned, are each provided with an actuating winding, a normally-disengaged main-contact member disposed in an energizing circuit of load-adjusting motor 25, and a normally disengaged auxiliary contact member disposed in a control circuit of the time-delay relays. The main contact members for the two relays are respectively shown at 103 and 104 and the auxiliary members at 106 and 107.

As illustrated, these motor-control relays are both in the downward position in which the operating windings thereof are deenergized. Energization of the relay operating winding actuates the contact members upwardly into engagement with the stationary contact elements with which they are associated. As already pointed out, the energization of each of these motor-control relays 58 and 59 may be effected by the action of time-delay relays 61 and 63, respectively, or by the engagement of regulator contact element sets 45a—46a and 48a—49a, respectively.

In the operation of the regulating system illustrated in Fig. 1, a normal value of power demand, from the alternating-current circuit, by motor 10 permits of a disengaged condition for both sets of contact members of the load regulator 24. In this condition, the several relays utilized in the control circuits of the system have the respective positions illustrated in the drawing. Thus, time-delay relays 61, 62, 63 and 64 are all in their armature-attracted positions, since the main operating windings of none of these relays are short circuited. Likewise, the motor-control relays 58 and 59 are in their deenergized positions.

The first portion of this description will be limited to the operation of the time-delay relays initiated by the engagement of the small-error-regulator contacts only. The assumption will, therefore, be made during this portion of the explanation that the regulator 24 is not provided with the additional sets of continuous-operation contact members shown in the drawing, or that, if such provision is made, the error in the regulated quantity does not become sufficiently great to effect closure of these contact members.

A closure of "lower" contact members 45 and 46 of the load regulator 24 is effected by an increase in the power output of motor 10 and generator 11 resulting from an increase in the load 12, and completes a circuit in shunt relation to the operating winding of time-delay relay 61, which circuit extends from one side of operating winding 68 of this relay through conductor 79, conductor 82, contact members 110 and 111 of time-delay relay 62, conductor 113, contact members 46, 45 and 45b, of the load regulator 24 and conductors 114, 83 and 78 back to the other side of the winding 68.

The deenergization of the operating winding of time delay relay 61 permits the armature 69 of the relay to move under the action of the spring 73, after a time delay, to effect engagement of contact elements 70 and 72. This operation completes a circuit for energizing the "lower" motor-control relay 58 which extends from positive conductor 55 through conductor 117, contact elements 70 and 72 of relay 61, conductor 118, the winding of relay 58, and conductor 119 back to negative conductor 56.

Thus energized, the relay 58 moves the contact members 103 and 106 upwardly to complete, respectively, circuits for energizing the load-adjusting motor 25 in the load-lowering manner, and, a time-delay-relay control circuit. The motor-energizing circuit extends from the positive conductor 55 through conductors 121 and 122, contact members 103 of relay 58, conductor 123, field winding 52 and armature 51 of motor 25, and conductor 124 back to negative conductor 56.

Thus energized, the motor 25 adjusts the rheostat 22 in the load-lowering direction, which adjustment or corrective action continues as long as relay 58 remains in the actuated position.

The contact member 106 of relay 58 completes a short circuit around the main-operating winding 87 of time-delay relay 62, which circuit extends from one side of the winding 87 through conductors 83, 98 and 126, contact members 106 of relay 58, and conductor 127 back to the other side of winding 87.

Thus deprived of its main magnetizing force, the time-delay relay 62, after a time delay, permits its armature 112 to be released to separate the contact members 110 and 111 and interrupt the short circuit which the closure of contact members 45 and 46 of the load regulator 24 had established around the operating winding 68 of time-delay relay 61.

Reestablishing the magnetizing force of the operating winding 68 of the relay 61 causes the relay armature to immediately be attracted and separate the contact members 70 and 72, thus interrupting the energizing circuit for motor-control relay 58. This later relay opens and interrupts the motor-energizing circuit and thus discontinues the corrective action and, in addition opens the short circuit about main winding 87 of time-delay relay 62.

Relay 62 likewise immediately moves to its armature-attracted position, under the action of main winding 87 now made effective, and, by the closure of contact members 110 and 111, reestablishes the short circuit about operating winding 68 of time-delay relay 61, assuming, of course, that the load-regulator contacts have continuously remained closed. It will be seen that this action again starts the cycle of operation just described, to effect, after the time delay required for relay 61 to move to its armature-released position, a continuation of the corrective action by again energizing the motor-control relay 58. This corrective action continues after the closure of motor-control relay 58 a sufficient time to permit the time-delay relay 62 to move to its armature-released position.

As long as the regulator contacts remain in engagement, the described cycle of operation will continue to repeat itself, thus effecting a step-by-step corrective operation of the load-adjusting motor 25 in the load-lowering direction. Once the desired adjustment of the load has been effected, and the contacts of the load regulator open, the corrective action is discontinued.

Should the load of motor 10 fall below the value which regulator 24 is set to maintain, "raise" contact members 48 and 49 of the regulator engage and complete a circuit in shunt relation to the operating winding 92 of the time-delay relay 63, which circuit extends from one side of winding 92 through conductors 83 and 114, regulator contacts 48b, 48 and 49, conductor 131, contact elements 132 and 133 of time-delay relay 64, and conductor 134 back to the other side of winding 92.

Thus deprived of its main magnetizing force, the armature of the time-delay relay 63 is moved, after a time delay, to its released position, thereby effecting, through closure of contact elements 136 and 137, the completion of an energizing circuit for "raise" motor-control relay 59, which circuit extends from positive conductor 55 through conductor 140, the contact elements 136 and 137 of relay 63, conductor 141, the winding of relay 59, and conductor 142 back to negative conductor 56.

Thus energized, relay 59 moves contact members 104 and 107 into engagement with their cooperating contact elements thereby completing, respectively, an energizing circuit for running load-adjusting motor 25 in the load-raising direction, and a short circuit around the operating winding of time-delay relay 64. The motor-energizing circuit extends from positive conductor 55, through conductors 121 and 122, motor-control-relay contact members 104, conductor 144, field winding 53 and armature 51 of motor 25 and conductor 124 back to negative conductor 56.

Thus energized, motor 25 runs load-adjusting rheostat 22 in the load-raising direction. This adjustment continues as long as relay 59 remains in the actuated position.

The short circuit completed by contact member 107 of relay 59 extends from one side of operating winding 97 of time-delay relay 64, through conductors 99, 98 and 126, relay contact members 107, and conductor 148 back to the other side of winding 97. Being deprived of its main magnetizing force, relay 64 allows, after a time delay, its armature to move to the released position, and thereby interrupts the engagement of relay contact elements 132 and 133, breaking, at this point, the short circuit around operating winding 92 of time delay relay 63 which the closure of regulator contacts 48 and 49 originally established. The interruption of this circuit, in restoring the main magnetizing force to relay 63, causes this relay to immediately move its armature to the attracted position thereby deenergizing, through the opening of contact elements 136 and 137, the actuating winding of motor-control relay 59.

The opening of relay 59 discontinues the corrective action and removes the short circuit from the operating winding 97 of time-delay relay 64. Relay 64, accordingly, at once moves to the armature-attracted position, and, assuming that contact elements 48 and 49 of regulator 24 remain closed, reestablishes the short circuit about the operating winding of time-delay relay 63.

This action again initiates the movement, after a time delay, of relay 63 to the armature-released position, and the cycle of operation just described continues to repeat itself as long as the regulator contacts remain closed.

Should the regulator contacts reopen before the time-delay relay upon which they act has moved to the armature-released position to energize the load-adjusting motor, it will be apparent that this time delay relay will continue to remain in the armature-attracted position thereby making it necessary, upon subsequent regulator action, for the regulator contacts to remain continuously closed for the period of time equal to that required for the relay to open.

The length of the active and inactive periods in the cycle of the step-by-step corrective action which the system of our invention provides may be regulated by changing the timing adjustment of the time-delay relays. It will be apparent, furthermore, that the length of these periods need not be made equal, since each of the periods depends upon the operating characteristic of one particular time-delay relay. This permits of individual adjustment, which in many applications is found to be particularly useful.

Thus far, the description has been limited to system operation effected by the engagement of the small-error contacts carried by the regulator. It will be apparent that the use of such contacts alone provides a satisfactory operating system for many applications and, hence, it will be understood that our invention applies to the system so far explained when considered as an entirety. Our invention also applies, however, to a system utilizing, in addition, the continuous-operation, large-error responsive contact elements carried by the regulator and connected with the load-adjusting motor-control relays 58 and 59 in the manner indicated in Fig. 1.

Considering the operation of this last-mentioned portion of the system which, is an optional though exceedingly useful feature in many applications, a large increase in load demanded by motor 10 moves contact-carrying member 35 a sufficient distance in a counter-clockwise direction to effect engagement of contact elements 45a and 46a. This engagement completes an energizing circuit for "lower" motor-control relay 58 which extends from positive conductor 55 through conductors 78, 83 and 114, contact elements 45a and 46a, conductors 215 and 118, the actuating winding of motor-control relay 58 and conductor 119 back to negative conductor 56.

Thus energized, relay 58 moves to and will remain in the upwardly actuated position continuously as long as the regulator contact elements named remain in engagement so that the load-lowering corrective action will proceed in a continuous manner during that time.

When load correction has proceeded to the point that the load drawn by motor 10 is reduced to an extent that regulator contact elements 45a and 46a no longer remain in engagement, the control will be transferred to contact elements 45 and 46 to effect the step-by-step corrective action which proceeds in the manner already explained. This step-by-step action continues, as has been pointed out, until the desired correction has been completed when both sets of regulator contact elements are disengaged.

Similarly, a large decrease in the load drawn by motor 10 causes "raise" regulator contact elements 48a and 49a to be brought into engagement. This engagement completes an energizing circuit for "raise" motor-control relay 59 which extends from positive conductor 55 through conductors 78, 83 and 114, the contact elements 48a and 49a, conductors 217 and 141, the actuating winding of motor-control relay 59 and conductor 142 back to negative conductor 56.

Thus energized, motor-control relay 59 moves to and remains in the upwardly actuated position continuously as long as the regulator contact elements named remain in engagement, so that the load-raising corrective action proceeds in a continuous manner.

When the correction has proceeded to a point at which regulator contact elements 48a and 49a no longer remain in engagement, control is transferred to contact elements 48 and 49 to cause the action to proceed in a step-by-step manner which has been explained in detail. This step-by-step action continues, of course, until the desired correction has been completely effected.

It has been seen that the system illustrated in Fig. 1 is disposed to provide a time-delay between the initial closure of the small error-responsive regulator contacts and the commencement of the corrective action. In certain modifications, this feature may not be required or desired. Our invention is applicable to such situations, also, since a modification thereof provides the same step-by-step corrective action through the use of time delay relays, but without incorporating the time-delay-start feature. One preferred embodiment of this second modification is illustrated in Fig. 2.

In Fig. 2, the system illustrated, as regards the main power circuits to be regulated and the load adjusting means is identical with that shown and described in Fig. 1. The difference in the two systems lies in the method of connection and combination of the time-delay relays which are interposed between the small-error responsive contacts of the load regulator 24 and the load-adjusting motor 25.

Instead of normally occupying the armature-attracted position as do time-delay relays 61, 62, 63 and 64 in Fig. 1 of the drawing, the time-delay relays 155, 156, 157 and 158, in the system of Fig. 2, are so connected as to normally occupy the armature-released position, which is illustrated. Likewise, in Fig. 2, auxiliary relays 160 and 161 are interposed between the regulator-contact-element sets and the time-delay relays upon which they act, in order that closure of the regulator contacts will effect an opening of a circuit in the time-delay relay control scheme, instead of a closure as in the system of Fig. 1. A third difference to be noted in the second modification of our invention is the fact that the auxiliary contact members of the "lower" and "raise" motor control relays 165 and 166, respectively, are of the normally closed type.

The time-delay relays mentioned may be exactly similar to those shown and described in the system of Fig. 1, and for purposes of explanation it will be assumed that such identity exists. The method of control is, however, slightly modified, as has been mentioned, in order to permit of an elimination of the time-delay-corrective-action-start feature.

In operation of the regulating system of Fig. 2, each of the time-delay relays normally has its main operating winding short circuited, as when the regulator contactors are disengaged, which is the case when the power drawn by motor 10 is of the desired magnitude. Consequently, these relays normally occupy the armature-released position illustrated.

A closure of the small error-responsive "lower" contact elements 45 and 46 of regulator 24 completes an energizing circuit for auxiliary relay 160 which extends from positive conductor 55 through conductor 170, contact elements 45 and 46 of the regulator, conductor 171, the actuating winding of relay 160, and conductor 172, back to negative conductor 56. Thus energized, relay 160 moves contact member 173 upwardly to interrupt a short circuit about the operating winding 175 of time-delay relay 155. This short circuit extended from one side of winding 175, through conductor 176, relay contact member 173 and conductor 177 back to the other side of winding 175.

Under the influence of the main magnetizing force thus received, relay 155 moves at once to the armature-attracted position thereby completing an energizing circuit for motor-control relay 165, which circuit extends from positive conductor 55 through conductor 179, contact elements 180 and 181 of relay 155, conductor 183, the winding of relay 165, and conductor 184 back to negative conductor 56.

Thus energized, motor-control relay 165 actuates contact member 103 upwardly to complete an energizing circuit which drives load-adjusting motor 25 in the load-lowering direction. The upward actuation of relay 165 also interrupts, by the opening of auxiliary contact member 186, a short circuit about operating winding 188 of time-delay relay 156. This short circuit was established from one side of winding 188 through conductor 189, contact members 186 of relay 165, and conductor 190 back to the other side of winding 188.

Thus acted on by the main magnetizing force, time-delay relay 156 immediately moves to the armature-attracted position to reestablish the short circuit about operating winding 175 of time-delay relay 155. Being deprived of the main magnetizing force, relay 155 moves, after a time delay, to the armature-released position thereby interrupting, through the opening of contact elements 180 and 181, the energizing circuit for motor-control relay 165 and discontinues the corrective action.

In opening, relay 165 reestablishes, through contact members 186, the short circuit around main operating winding 188 of time-delay relay 156. After a time delay, relay 156 moves to the armature-released position and removes the short circuit from operating winding 175 of relay 155. As a result, relay 155 immediately moves to the armature-attracted position and reenergizes motor-control relay 165, in the manner previously explained.

This operating cycle continues as long as the regulator contacts remain closed, and thus effects the step-by-step corrective action, without a time delay preceding the initial step.

Closure of the small error-responsive "raise" regulator contact elements 48 and 49 similarly energizes auxiliary relay 161 through a circuit which extends from positive conductor 55, conductor 170, contact elements 48 and 49 of the regulator, the winding of relay 161, and conductor 193 back to negative conductor 56.

In operating, the relay 161 removes a short circuit from the operating winding 195 of time-delay relay 157, which circuit extended from one side of winding 195 through conductor 196, contact members 197 of relay 161, and conductor 198 back to the other side of winding 195.

Relay 157 immediately closes contact elements 200 and 201, completing an energizing circuit for "raise" motor-control relay 166, which circuit extends from positive conductor 55 through conductor 203, the contact elements 201 and 200 of relay 157, conductor 204, the winding of relay 166, and conductor 205 back to negative conductor 56.

In closing, motor-control relay 166 energizes the load-adjusting motor 25 in the load-raising direction, and at the same time removes a short circuit from operating winding 207 of time delay relay 158, which circuit extended from one side of winding 207, through conductors 208 and 209, auxiliary contact members 210 of relay 166, and conductor 211 back to the other side of winding 207.

Relay 158 thus immediately moves its armature to the attracted position, reestablishing the short circuit about operating winding 195 of time-delay relay 157 by the closure of its contact elements 214 and 215.

Time-delay relay 157 moves, after a time delay, to the armature-released position and thus deenergizes, by opening of contact elements 200 and 201, motor-control relay 166. This deenergization allows the system to return to the original condition obtained before the closure of regulator-contact elements 48 and 49. As long as the regulator contacts remain closed, the cycle of operation just described will be repeated.

It is thus apparent that, in the modification of our invention illustrated in Fig. 2, for small magnitude errors, a step-by-step corrective action is attained without a time delay preceding the initial step.

The description of the system of Fig. 2 thus far given has been limited, as was the method of treatment of the system of Fig. 1, to operation effected by the closure of small-error responsive contact elements of the regulator. As was pointed out in connection with the system of Fig. 1, our invention is not to be limited to a system which utilizes the two selectively responsive sets of contacts on the regulator, but is rather to be construed as covering the portion of the system of Fig. 2 just explained as an entirety and, in addition, a system which utilizes the large-error responsive contact elements on the regulator.

Considering, in the system of Fig. 2, the operation of these large-error responsive contact elements, a large increase in the power drawn by motor 10 effects the engagement of regulator contact elements 45a and 46a to complete an energizing circuit for lower motor-control relay 165 which extends from positive conductor 55 through conductor 170, the contact elements 45a and 46a, conductors 220 and 183, the actuating winding of relay 165 and conductor 184 back to negative conductor 56. Thus energized, this motor-control relay remains closed as long as the regulator contact elements named are in engagement, so that the corrective action during such time proceeds in a continuous manner.

Correction of the load to a degree which allows contact elements 45a and 46a to open, transfers, as in the system of Fig. 1, the control to small-error responsive contact elements 45 and 46 to effect the step-by-step corrective action during the remainder of the corrective operation.

Likewise, a large decrease in the load drawn by motor 10 effects engagement of regulator elements 48a and 49a to complete an energizing circuit for "raise" motor control relay 166 which extends from positive conductor 55 through conductor 170, the contact elements 48a and 49a, conductor 222, the actuating winding of relay 166 and conductor 205 back to negative conductor 56. Thus energized, relay 166 causes the corrective action to proceed in a continuous manner as long as regulator contact elements 48a and 49a remain engaged. This engagement of these elements transfers the control to regulator contact elements 48 and 49 to effect a step-by-step corrective action during the remainder of the corrective operation.

Although we have shown and described certain embodiments of our invention, we are fully aware that many further modifications thereof are possible. Our invention, therefore, is not to be restricted except insofar as is necessitated by the prior art and by the spirit of the appended claims.

We claim as our invention:

1. In combination, a regulating system comprising a regulator, a time-delay relay controlled by said regulator, a quantity-adjusting means controlled by said relay, a second time-delay relay controlled in accordance with the position of the first named time-delay relay, said second named relay being operative to interrupt the control of said first named relay by said regulator.

2. In combination with a regulator having separate sets of contact elements selectively engageable in accordance with different predetermined values of the regulated quantity and a quantity-adjusting means disposed to be selectively operable in the "raise" and "lower" directions in accordance with the respective engagement of said sets of contact elements, two time-delay relays disposed in the control circuits intermediate each set of regulator contacts and the quantity-adjusting means in a manner that the regulator controls an actuating circuit to one of said relays, the second of said relays being controlled by the first, and means operated by said second named relay for reacting upon said first in such manner that both of said relays will be caused to alternately open and close as long as the regulator contacts remain closed, the said quantity-adjusting means being operated in accordance with the position of one of said relays.

3. An electrical system comprising, in combination, a regulator, a normally-closed relay having instantaneous-closing, time-delay opening characteristics, disposed to receive from said regulator an opening impulse, a quantity-adjusting means disposed to be operated when said relay occupies the open position, a second normally-closed relay, also of the instantaneous-closing, time-delay opening type, disposed to receive an opening impulse during the time that said first relay is in its open position, and means actuated by the opening of said second relay for interrupting the opening impulse to said first relay, thus allowing it to return to the closed position, said means acting to restore the opening impulse, from the regulator, to said first relay upon reclosure of said second relay.

4. An electrical system comprising, in combination, a regulator, a normally-open relay, having instantaneous-closing, time-delay opening characteristics, disposed to receive a closing impulse from said regulator, a quantity-adjusting means disposed to be operated when said relay occupies the closed position, a second normally-open relay, also of the instantaneous-closing, time-delay opening type, disposed to receive a closing impulse during the time that said first relay is in its closed position, and means actuated by the closing of said second relay for imparting an opening impulse to said first relay, said means acting to remove said impulse upon the reopening of said second relay.

5. In combination, a regulator having one set of contact elements disposed to engage when a quantity influencing said regulator departs an appreciable amount from a desired value, and a second set of contact elements disposed to engage when said quantity error is of a given larger magnitude, a quantity-adjusting means, and means for causing said quantity-adjusting means to be operated in a step-by-step manner when the regulator contact elements of said first set only are engaged, and in a continuous manner when the regulator contact elements of said second set are engaged.

6. In a system comprising a regulator and a quantity-adjusting means controlled thereby, a set of regulator contact elements disposed to engage when a quantity influencing said regulator departs from a desired value, a second set of regulator contact elements disposed to engage when the regulated quantity departs a given larger amount from the desired value, time-delay relay means for causing said quantity-adjusting means to be operated in a step-by-step manner when the regulator contact elements of said first set only are engaged, and means for causing said quantity-adjusting means to be operated in a continuous manner when the regulator contact elements of said second set are engaged.

7. In a system comprising a regulator and a quantity-adjusting means controlled thereby, a set of regulator contact elements disposed to engage when a quantity influencing said regulator departs from a desired value, a second set of regulator contact elements disposed to engage when the regulated quantity departs a given larger amount from the desired value, a time-delay relay controlled in accordance with the engagement of the regulator contact elements of said first named set, means for causing said quantity-adjusting means to be operated in accordance with the position of said relay, a second time-delay relay disposed to be acted upon in accordance with the position of the first named time-delay relay, and means operated by said second relay for reacting upon said first in such manner that said first relay will be caused to alternately open and close a circuit through its contacts as long as said first set of regulator contact elements only are engaged, and means for causing said quantity-adjusting means to be operated in a continuous manner when the regulator contact elements of said second set are engaged.

JOHN H. ASHBAUGH.
RALPH A. GEISELMAN.